(No Model.)
F. ECAUBERT.
MECHANISM FOR MAKING SPECTACLE BOWS.
No. 518,099. Patented Apr. 10, 1894.
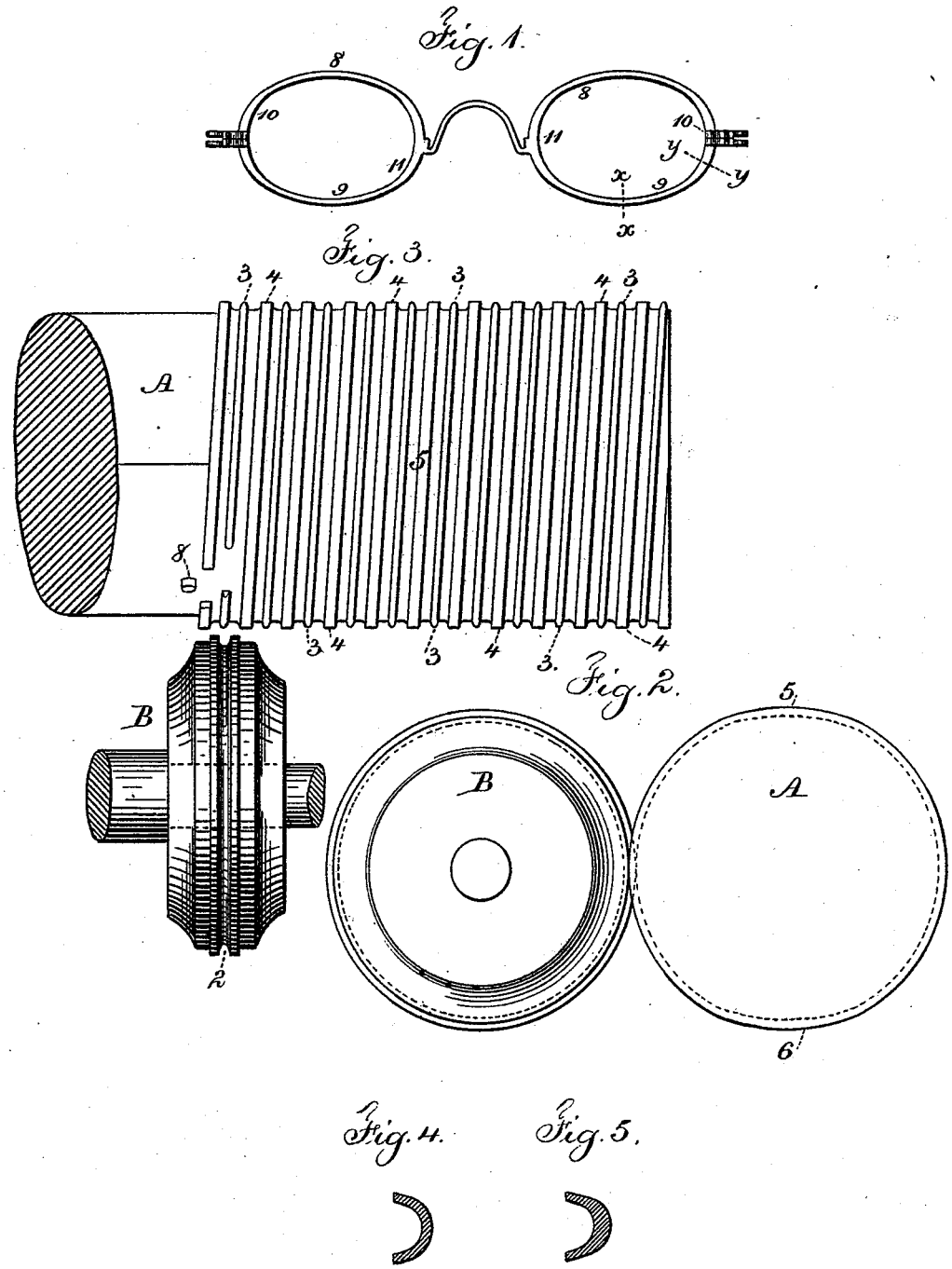

UNITED STATES PATENT OFFICE.

FREDERIC ECAUBERT, OF BROOKLYN, NEW YORK.

MECHANISM FOR MAKING SPECTACLE-BOWS.

SPECIFICATION forming part of Letters Patent No. 518,099, dated April 10, 1894.

Application filed May 13, 1892. Serial No. 432,849. (No model.)

*To all whom it may concern:*

Be it known that I, FREDERIC ECAUBERT, a citizen of the United States, residing at Brooklyn, in the county of Kings and State of New York, have invented an Improvement in the Manufacture of Spectacle-Bows, of which the following is a specification.

In the manufacture of spectacles it is usual to employ a wire of a crescent or other shape sectionally bent up to form the spectacle bow that receives the glass, and to the middle portion thereof is soldered or brazed the bridge or nose piece joining the two bows together, and to the ends of the bows are soldered or brazed the joint pieces receiving the temple springs; and it is usual to stretch the bows upon shapes or forms, to bring them to the exact size and shape of the glasses. In the soldering operation the metal is more or less softened by the heat adjacent to the parts that are soldered on, and this is especially the case with the better class of spectacles such as those made with gold frames. The consequence is that in the shaping and stretching operation to which the bows are subjected, the elongation is mostly of the softer portions adjacent to the bridge and ends, and hence the bows become weakest at the places where there is most strain and liability to break. To lessen this liability to injury, flanges or junction pieces have sometimes been introduced at the ends of the bridge piece and at the ends of the joints, but these are expensive and often unsightly.

My present invention is made with reference to increasing the thickness of the metal at the ends of the bows and at the junctions of the bows with the bridge pieces; and in carrying out this invention I am able to obtain a proper proportion of strength in all parts of the bows and I employ a peculiar apparatus or mechanism for preparing the bows, and in so doing produce the spectacle frame having the bows thickest at the junction of the bridge piece and at the ends.

In the drawings, Figure 1 represents a spectacle bow complete and containing my improvement. Fig. 2 is an end view in magnified size of the mandrel or form-roll and of the roller made use of in preparing the wire of the bow. Fig. 3 is a plan view of the mandrel and roller. Fig. 4 is a section of the bow at the line x x, and Fig. 5 is a section at the line y y, both of these figures being of magnified size to more clearly represent the improvement.

The mandrel or form roll A is adapted to be mounted in any suitable support and it receives a rotary movement from suitable power, and the roll B is upon an axis that allows it to move endwise so as to follow a screw threaded indentation upon the mandrel or form A. The end motion can be given either to the mandrel or to the roll as most convenient, and any suitable apparatus may be employed for holding the roll and the mandrel and rotating the mandrel or form-roll.

The edge of the roll B is made with a peripheral groove of a size and shape corresponding to the exterior surface of the bow to be made, and the screw formed groove of the mandrel or form roll A has a peripheral rib 3 corresponding to the interior recess of the spectacle bow, and it is preferable to employ upon the mandrel the ribs 4 which are at a distance apart corresponding to the width of the periphery of the roll B, so that the roll will travel in the groove between the ribs 4, and the space between the groove 2 in the roll B and the rib 3 upon the mandrel A corresponds to the thickness and shape of the metal wire forming the bow, and the peripheral measurement of the mandrel or form roll is to correspond to the peripheral measurement of the glass to be inserted in the spectacle bow, or nearly so.

The mandrel or form roll A is not circular, but it is flattened slightly at the opposite points 5 and 6, and upon the mandrel and in line with the flattened portions suitable marks are made to guide the workman in marking and cutting up the wire after it has been rolled around the mandrel.

The wire for the spectacle bows is frequently of a crescent shape in section and it is slightly larger than the thickest portion of the finished spectacle bow, and the wire is passed in between the roll B and the rib 3 upon the mandrel or form roll, and by suitable mechanism the roll B is pressed firmly against the wire, and the form roll or mandrel is rotated so that the wire is drawn along and the wire is reduced in thickness to the proper extent, so that the spectacle bow along the upper and lower portions 8, 9, Fig. 1, will be of a thickness illustrated in larger size Fig. 4, and the spectacle bow wire will be left thicker at the parts 5 and 6 of the mandrel or form-roll so as to obtain at those parts the requisite strength for the portions 10 and 11, Fig. 1, and as illustrated in larger size in Fig. 5. The reduced wire must be moved along with a positive motion corresponding to or in harmony with the surface of the form-roll or mandrel, so that the reductions are made at the proper parts with absolute accuracy. A convenient means for effecting this is to bend a hook in the wire and hook it over the pin 8, in said mandrel and projecting above its surface so that the wire is drawn along and wound tightly on the form under the rotation of the form and the pressure of the reducing device such as the roller B. As the operation progresses the crescent shaped wire is rolled upon and allowed to remain around the mandrel, such wire being wound up on the mandrel as the rolling operation progresses, and this mandrel will be of any suitable length adapted to the manufacture of any desired number of spectacle bows, and when the mandrel has been filled with the coils of wire thus rolled down to different thicknesses, the end of the wire is to be clamped or firmly held and the workman marks upon the wire lines or scratches to indicate where the bridge piece is to be soldered on or brazed and also where the wire is to be separated or cut apart to form the ends upon which the joint pieces of the spectacle frame are soldered or brazed, and the thickness of the metal that is left where the soldering or brazing takes place, can be more or less as desired, according to the extent of the flattening that the mandrel or form-roll receives at its opposite sides 5 and 6, hence the spectacle bow can be made of the proper proportionate strength all around, and there is no more tendency for the spectacle bow to break where the joint pieces or where the bridge piece is soldered on or brazed, than at any other point.

By this improvement the expense of manufacture is very much lessened, especially where precious metal is made use of, because the bows can be reduced in thickness at the top and bottom portions and at the same time left sufficiently strong at the end portions, and the manipulation or hand work is not increased by the present improvement.

In place of flattening the mandrel along its opposite sides, the parts of the mandrel may be removed only at the places where the metal is to be left the thickest by the rolling operation and the outer edges of the roll B may in that case continue to rest against the cylindrical portions of the mandrel.

Some spectacles are made with grooves in the edges of the glasses receiving wires that form the bows. My present improvement is equally available with this character of frame, it being understood that in all cases the ribs or grooves of the mandrel or form-roll are of the proper shape for making the desired character of wire bows, and the spectacle frames are much stronger than those heretofore made in consequence of the bow wires being thicker at the places where most likely to receive injury.

The roll B is advantageously placed on an arbor so as to stand in the same plane as the portion of the screw with which the edge of such roll is in contact. In this case the arbor and roll may be moved along bodily and parallel to the mandrel by a slide rest or other suitable support, or the mandrel may be moved endwise.

In my improvement it is necessary that the power be applied to rotate the form roller A, and the roller B being circular, the same does not require to receive a positive motion but may turn by contact with the wire as the latter is drawn along; and it will also be apparent that the form-roll A pulls the wire along and the roller B is only a reducer of the thickness, and so long as the completed wire is moved along by a positive movement in harmony with the form-roll, the accuracy in the measurements between the thicker portions will be maintained. In the devices shown the form-roll itself is the means for drawing the wire along with a positive motion because the wire is wound upon such form roll; but I do not limit myself in this particular.

The device shown for giving the wire a positive motion in harmony with the form-roll is the pin on such form roll around which the wire is hooked; any suitable means may be used for giving the wire the positive movement longitudinally as it is reduced.

The roller B forces the wire into the groove of the form roll or mandrel in the act of reducing the thickness of the wire to a greater extent where the bottom of the groove is not flattened or recessed, and the wire remaining in the groove is measured in its length between one thicker part and the next by the groove itself of the form mandrel, hence inaccuracy in the measurements becomes impossible.

In cases where two rolls have been used to pass through between them a wire or rod and one roll has been a form roll to reduce the wire or rod more at one part than at another, the lengths between the thicker portions vary in consequence of the rollers slipping more or less on the article, and the article reduced does not correspond to the circumference of the form roll.

Efforts have been made to prepare spectacle wire for the frames by a rolling operation, but in consequence of the rolls slipping on the wire and there being no positive drawing action to move the reduced wire along in harmony with the rolls, all such efforts have been failures.

By my improvement, in which the finished wire receives a positive longitudinal movement in harmony with the surface of the form roll, the aforesaid difficulties are avoided and absolute accuracy is obtained.

I claim as my invention—

1. The combination with a pressure roller, of a form mandrel and means for causing the wire to pass around the mandrel and between the mandrel and the roller at the speed of the mandrel, there being recesses at intervals in the form mandrel whereby the wire is shaped longitudinally about the form mandrel and reduced transversely at intervals, substantially as specified.

2. The combination with a pressure roller, of a form mandrel having a groove that is recessed or flattened at intervals, and means for holding the wire from slipping in the groove of the form mandrel, whereby the wire is shaped longitudinally by being pressed into the groove of the mandrel and the wire is thicker at the regular intervals where such mandrel is recessed, substantially as specified.

3. The combination with a pressure roller, of a form mandrel having a groove that is recessed at intervals and passes in the form of a screw around the mandrel and means for holding the wire from slipping in the groove, whereby the wire is shaped longitudinally by being pressed into the groove of the mandrel and the wire is thicker at regular intervals where such mandrel is recessed, substantially as set forth.

Signed by me this 9th day of May, 1892.

F. ECAUBERT.

Witnesses:
   GEO. T. PINCKNEY,
   WILLIAM G. MOTT.